US 6,547,388 B1

(12) United States Patent
Bohn (10) Patent No.: US 6,547,388 B1
(45) Date of Patent: Apr. 15, 2003

(54) ENCLOSED RELEASABLE AND ADJUSTABLE EYEGLASS RESTRAINING AND SECURING DEVICE AND METHOD

(76) Inventor: Jared Bohn, 20 Pal St., Plainview, NY (US) 11803

( * ) Notice: Subject to any disclaimer, the term of this patent is extended or adjusted under 35 U.S.C. 154(b) by 0 days.

(21) Appl. No.: 10/096,793

(22) Filed: Mar. 13, 2002

(51) Int. Cl.$^7$ .............................. G02C 5/20; G02C 5/14
(52) U.S. Cl. ........................ 351/118; 351/117; 351/123; 351/156
(58) Field of Search .................................. 351/157, 156, 351/41, 158, 111, 118, 117, 123; 2/452

(56) References Cited

U.S. PATENT DOCUMENTS

| | | |
|---|---|---|
| 3,874,776 A | 4/1975 | Seron |
| 4,133,604 A | 1/1979 | Fuller |
| 4,479,703 A * | 10/1984 | Enghofer ..................... 351/157 |
| 4,541,696 A | 9/1985 | Winger et al. |
| 4,657,364 A | 4/1987 | Murrell |
| 4,692,002 A | 9/1987 | Meistrell |
| 4,696,556 A | 9/1987 | Perry, III |
| 4,743,105 A | 5/1988 | Tabacchi |
| 4,783,164 A | 11/1988 | Heiberger |
| 4,818,094 A | 4/1989 | Lyons |
| 4,820,036 A | 4/1989 | Seet |
| 4,927,258 A | 5/1990 | Mc Kenna et al. |
| 4,930,885 A | 6/1990 | Laschober |
| 4,976,531 A | 12/1990 | Kahaney |
| 4,998,816 A | 3/1991 | Eggenberger et al. |
| 5,032,018 A | 7/1991 | Mc Culley et al. |
| 5,092,668 A | 3/1992 | Welch et al. |
| 5,102,216 A | 4/1992 | Mitchell |
| 5,181,052 A | 1/1993 | Mc Clellan |
| 5,235,355 A | 8/1993 | May |
| 5,367,345 A | 11/1994 | Da Silva |
| 5,367,347 A | 11/1994 | Wilson et al. |
| 5,384,605 A | 1/1995 | Escobosa |
| 5,507,075 A | 4/1996 | Tillstrom |
| 5,528,800 A | 6/1996 | Kliot |
| 5,541,676 A | 7/1996 | Pallat |
| 5,541,677 A | 7/1996 | Huhtala |
| 5,575,042 A | 11/1996 | Kalbach |
| 5,593,024 A | 1/1997 | Seiler |
| 5,642,178 A | 6/1997 | Leonardi et al. |
| 5,664,291 A | 9/1997 | Stoller |
| 5,735,393 A | 4/1998 | Shiue et al. |
| 5,786,882 A | 7/1998 | Satterthwaite |
| 5,790,228 A * | 8/1998 | Bell, III ..................... 351/111 |
| 5,859,684 A | 1/1999 | Rittmann |
| 5,898,472 A | 4/1999 | Oshikawa |
| 5,905,560 A | 5/1999 | Daniel |
| 5,918,351 A | 7/1999 | Chou |
| 5,940,938 A | 8/1999 | Davancens et al |
| 6,000,795 A | 12/1999 | Van Rysselberghe |
| 6,062,690 A | 5/2000 | Kliot |
| 6,065,833 A | 5/2000 | Tiano |
| 6,092,897 A | 7/2000 | Smerdon, Jr. |
| 6,115,843 A | 9/2000 | Travalgia |
| 6,142,628 A | 11/2000 | Saigo |

\* cited by examiner

*Primary Examiner*—Hung Xuan Dang
(74) *Attorney, Agent, or Firm*—Kenyon & Kenyon (57) ABSTRACT

A device for restraining eyeglasses around neck and for securing eyeglasses to head includes an arrangement configured to retract a strap part into a hollow portion of a temple leg. The strap coils around itself or retracts by another arrangement. The retracting arrangement is controlled by a button or slide to retract the strap and to stop retracting the strap. Two independently retractable strap parts are provided, each connecting to a different temple leg of eyeglasses or sunglasses. The two independently retractable strap parts are connectable to each other in a rearward section of the strap parts.

46 Claims, 5 Drawing Sheets

FIG. 5 ized eyewear. Therefore, when purchasing an eyewear restraining strap, it is important to assess the compatibility of the strap-system with the intended eyewear.

ENCLOSED RELEASABLE AND ADJUSTABLE EYEGLASS RESTRAINING AND SECURING DEVICE AND METHOD

FIELD OF THE INVENTION

The present invention relates to a device for restraining eyeglasses around the neck and securing eyeglasses to the head.

BACKGROUND INFORMATION

The problem of lost or misplaced eyeglasses or sunglasses is familiar to anyone who has worn any type of eyewear. Restraining straps are a common solution to the problem and exist in several different variations. The most common examples of a retention strap is a string, strap, or chain affixed to the frontward portion of the temple legs. This type of strap is useful in that the user can remove the eyewear from the head, lower the eyewear in front of the face, and rest the eyewear on the chest. The strap in this example loops over the neck and holds the glasses around the neck. Variations of this traditional strap include adjustable length straps. A variable length strap can be used to position the eyewear when not in use to be higher or lower on the chest, including close around the neck. Additionally, when used with a strap appropriate for use against the head, a variable length restraining strap can be used to secure eyewear on the head while the user is wearing the glasses. Length adjustment devices in use for variable length restraining straps include a hook-and-loop fastener to fasten the pieces together either directly from two strap parts or where one or both ends of the strap route around a pin and double back on itself or themselves. Several other devices are in use for adjusting the restraining strap length, including buckles and a notched strap, a loop of strap pulled through a constricting device, and both ends of the strap pulled through a constricting device.

Most, if not all, restraining straps are separable from, and often marketed and sold separately from, the eyewear with which they are used. Restraining straps of this kind attach to eyeglasses in many different ways, including a receptacle passed over the rearmost portion of the temple leg that resists removal through constriction of the temple leg and the friction induced thereby. This device may be preferable for restraining straps that are intended to be used to secure the eyewear while wearing the eyewear on the head. An alternative attachment device may be a loop passed over the end of each temple leg and positioned around the forward portion of the temple leg where the loop can be tightened. This type of connection may be preferable for restraining strap systems that do not secure the eyewear while the user is wearing the eyewear.

However, the use of conventional restraining straps may merely mean the substitution of new and different problems for the problem of lost or misplaced eyewear. Conventional eyewear restraining straps may lack adjustability while hanging around the neck or may be awkward and distracting when the eyewear is in use. This is especially true of restraining straps that attach to the forward section of the temple legs. Excessively long restraining straps can be unsightly when not in use (e.g., when the user is wearing the eyeglasses). Additionally, there is the possibility of misplacing the restraining straps themselves when they are detached from the eyewear. The act of attaching and detaching the restraining straps can be difficult and annoying, and the connection methods may be ill-suited to certain types of eyewear. Therefore, when purchasing an eyewear restraining strap, it is important to assess the compatibility of the strap-system with the intended eyewear.

The inability to easily adjust the length of eyewear restraining straps partly explains the fact that most restraining straps may excel at only one function of eyeglass straps (either securing around the neck when not in use or securing around the head while in use).

U.S. Pat. No. 4,657,364 describes an eyeglass strap that connects with a hook-and-loop fastener behind the user's head.

U.S. Pat. No. 5,898,472 describes a retractable eyeglass strap that uses a winding mechanism that can be affixed to a hat or worn behind the neck by the user.

U.S. Pat. No. 4,743,105 describes an adjustable eyeglass strap using an adjustment system positioned at the forward end of two temple legs and using a hook-and-loop fastener system.

U.S. Pat. No. 5,507,075 describes an eyeglass strap that connects to the rearward end of the temple legs of eyeglasses and is adjustable.

U.S. Pat. No. 5,664,291 also describes an eyeglass strap that connects to the rearward end of the temple legs of eyeglasses and is adjustable.

SUMMARY OF THE INVENTION

It is an object of the invention to provide a restraining strap system for eyewear that addresses the problems noted above, while providing an easy to use and aesthetically pleasing eyewear accessory. According to one example embodiment of the present invention, the device for restraining eyeglasses includes two temple legs, each of the temple legs connecting to an end piece of a central frame member; a strap that connects to both temple legs and is able to be separated into two strap parts; an arrangement for adjusting the length of a strap part or the lengths of both strap parts; and a connector for the two rearward ends of the strap parts. Alternative embodiments provide various connection arrangements for the strap parts, various length adjustment arrangements, and additional accessories including stop mechanisms and hold/release mechanisms.

DETAILED DESCRIPTION

Figure 1:
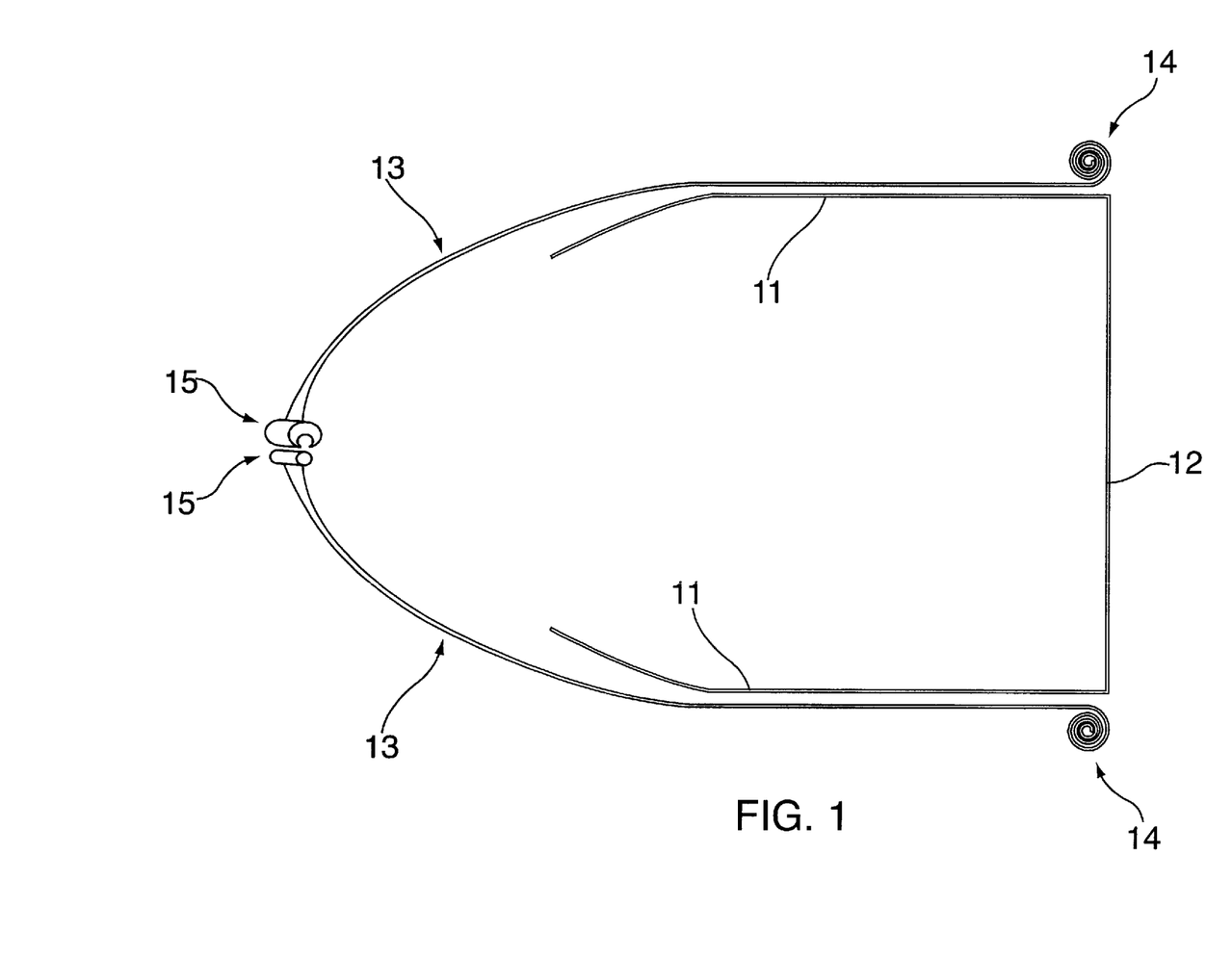
FIG. 1 is a schematic top plan view of a set of eyeglasses with a restraining strap according to the present invention.

FIG. 1 illustrates a set of eyewear with two temple legs 11 connected at a frontward side to the end pieces of a central frame member 12. Temple legs 11 each include a length adjustor 14 for adjusting a length of a strap part 13. Each strap part 13 is connected to the length adjustor 14 and extends rearwardly from the length adjustor 14. Each strap part 13 is equipped with a connector 15 on the rearmost part of each strap part 13 for connecting to the other strap part 13. Length adjustor 14 may be completely enclosed within temple leg 11, and a portion of strap part 13 may be enclosed within temple leg 11. Alternatively, length adjustors 14 may be mounted on both ends of central frame member 12 and may be completely enclosed within central frame member 12.

Length adjustors 14 are configured to retract strap parts 13 to allow for an adjustable and removable restraining strap. A maximum length for a restraining strap is achieved by releasing the hold/release mechanism and pulling strap part 13 so that strap part 13 completely unwinds from length adjustor 14. The hold/release mechanism is then re-engaged to lock the strap parts in position and to prevent length adjustor 14 from retracting strap part 13. This procedure is repeated for the other strap part 13, and both strap parts 13 are connected together by connectors 15. Numerous connection arrangements are possible and include, but are not limited to, hook-and-loop fasteners, clip mechanisms, magnetic connectors, buckles, slide connectors, clasp mechanisms, and tongue-and-groove connectors. Alternatively, strap parts 13 may be connected when extending each strap part to maximum length. A tight fit for the restraining strap system is achieved by connecting connectors 15, placing the eyewear on the head in the traditional manner, placing the two connected strap parts 13 behind the neck, and simultaneously releasing the hold/release mechanisms for both strap parts 13. Releasing the hold/release mechanism while wearing the strap parts around the neck allows length adjustor 14 to retract the length of strap parts 13 required to remove substantially all slack from strap parts 13. Use of an appropriate spring constant may allow length adjustor 14 to retract the loose portion of strap parts 13 and to induce a predetermined amount of tension into the restraining strap system. The tension introduced into the restraining strap system is useful for the eyeglass wearer during periods of high activity, for instance, during sports activities, and during periods where the risk of eyewear loss is high, for instance while boating. In another mode of operation, connectors 15 of strap parts 13 are disconnected, and then the hold/release mechanisms for both strap parts 13 are released. Strap parts 13 are then fully retracted by length adjustor 14. Strap parts 13 are fully retracted when connector 15 contacts a stop mechanism on each temple leg 11. Alternatively, a stopper may be utilized to contact the stop mechanism in the fully retracted position. In the fully retracted position, the eyewear may appear as normal eyewear and may be useable in the same manner as normal eyewear.

Figure 2:
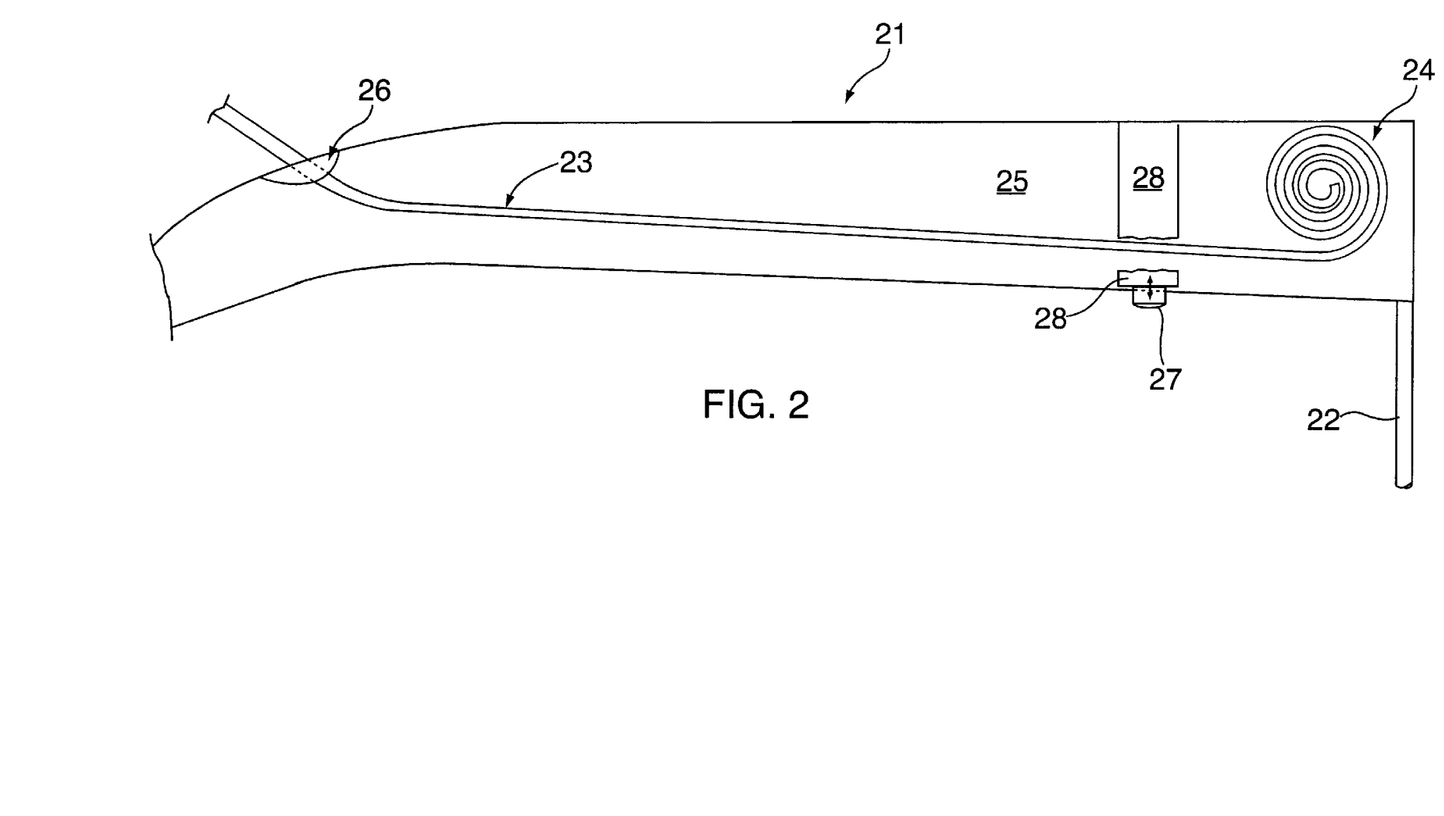
FIG. 2 is a schematic top plan view of the front portion of one temple piece of a set of eyeglasses with a restraining strap according to the present invention.

FIG. 2 is a top plan view of a portion of one temple leg, a portion of a central frame member 22, and a portion of a strap part 23. Temple leg 21 encloses a length adjustor 24 for adjusting a length of a strap part 23 in an enclosed temple space 25. Strap part 23 passes from the length adjustor 24 for adjusting a length of a strap part 23 through a hold/release mechanism enclosed in enclosed temple space 25, then rearwardly to an exit passage 26 in a rearward section of temple leg 21. Exit passage 26 may be positioned in a rearward section of temple leg 21, as shown in FIG. 2, or may alternatively be positioned at the very end of temple leg 21 so that strap part 23 projects from the very tip of temple leg 21. In alternative embodiments, exit passage 26 may be positioned at any position along temple leg 21. In alternative embodiments, strap part 23 extends from a length adjustor (not shown) positioned in an enclosed space (not shown) of central frame member 22 and exits by a passage (not shown) near the sides of central frame member 22.

Strap part 23 passes through exit passage 26 before connecting with another strap part. Exit passage 26 may be configured as a stop mechanism to prevent length adjustor 24 from retracting strap part 23 to an irretrievable position (e.g., inside enclosed temple space 25). This stop mechanism may be configured, for example, as a hole with a diameter smaller than a connector, such that, when the hold/release mechanism 28 is released by button 27 while the connector is disconnected from the other connector on the other strap part, the strap part 23 retracts into enclosed temple space 25 and onto length adjustor 24, until the connector contacts the stop mechanism, illustrated in the form of exit passage 26. Additionally, exit passage 26 may be of slightly larger dimension than strap part 23 in order to prevent twisting or entangling of strap part 23 within enclosed temple space 25. Hold/release mechanism 28 is activated and deactivated by button 27 and is also contained within enclosed temple space 25. Button 27 may be operated as a pure on/off system, with hold/release mechanism 28 being activated to either lock strap part 23 at a set length or to retract strap part 23, with a total tensile force available from length adjustor 24 being applied to strap part 23. Alternatively, button 27 may be operated as a continuously variable activator, with hold/release mechanism 28 being activated to either lock strap part 23 at a set length or to retract strap part 23 with a continuous spectrum of tensile force up to a maximum tensile force available from length adjustor 24. Button 27 may induce a variable tensile force on strap part 23 through a continuous spectrum of pressure. For instance, releasing button 27 may lock strap part 23, application of slight pressure to button 27 may induce a small tensile force, and application of increasing pressure to button 27 may induce an increasing tensile force up to a maximum tensile force. In an alternative embodiment, button 27 may have three positions to control operation. A first position may be for retracting strap part 23, a second position may be for holding strap part 23 in the set position, and a third position may be for extending strap part 23, with or without a manual assistance pulling on strap part 23. Button 27 may be positioned anywhere along temple leg 21, including but not limited to the top, bottom, inside and outside of temple leg 21, or anywhere on central frame member 22.

Figure 3:
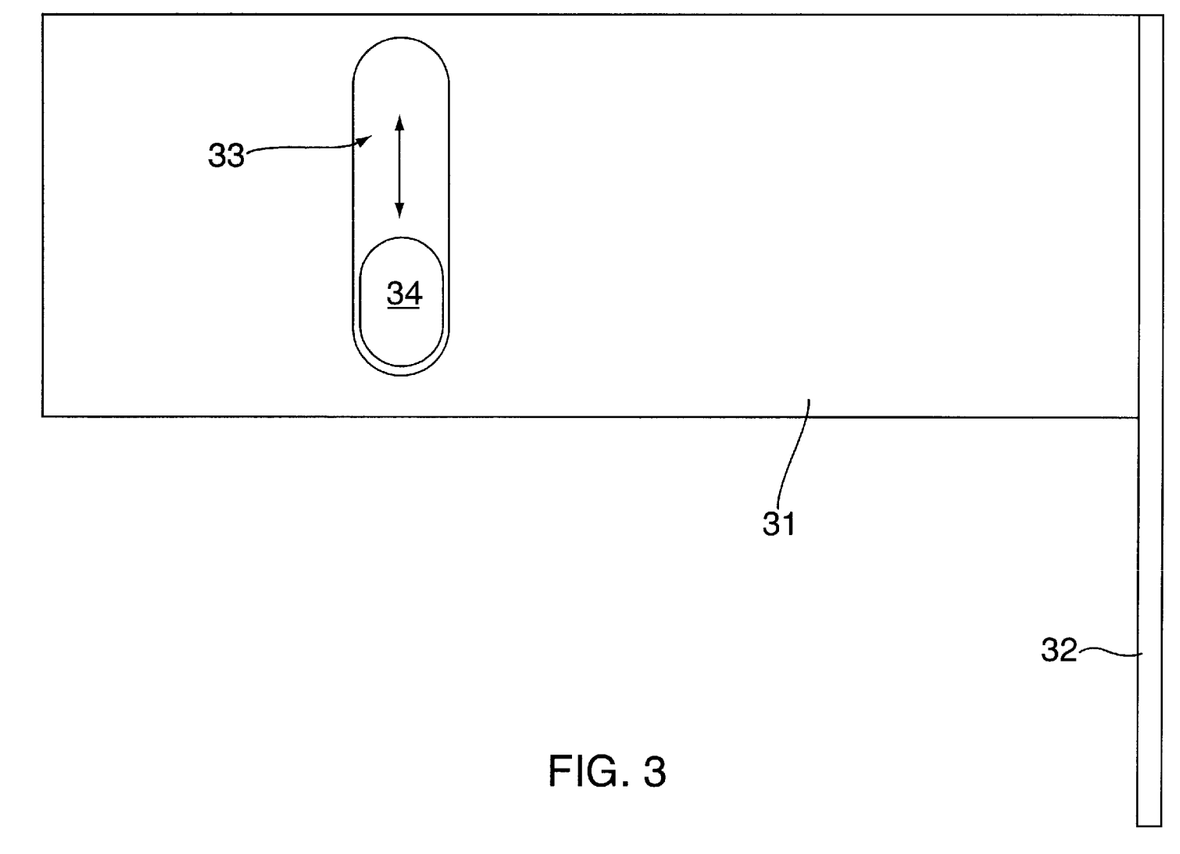
FIG. 3 is a schematic side view of an inward side of the front portion of one temple piece of a set of eyeglasses with a restraining strap according to another example embodiment of the present invention.

FIG. 3 illustrates another example embodiment of the present invention, and specifically, an example embodiment of the switch configured to activate and deactivate the hold/release mechanism. FIG. 3 illustrates the inward side temple leg 31 connecting to central frame member 32. Also illustrated on the inward side of temple leg 31 is slide 34 in slide channel 33. Slide 34 activates and deactivates the hold/release mechanism for a strap part. Sliding slide 34 to the top of slide channel 31 locks the hold/release mechanism so that the strap part is not retracted automatically by the length adjustor. Similarly, sliding slide 34 to the bottom of slide channel 31 releases the hold/release mechanism so that the strap part is retracted automatically by the length adjustor. Alternatively, the positions of the lock and release positions for slide 34 in slide channel 31 may be reversed. Slide 34 may be equipped with an automatic return mechanism that provides that, absent pressure from a user, slide 34 returns to a position in which hold/release mechanism is locked, and therefore the strap part length is set. Application of pressure to slide 34 may release the hold/release mechanism and thereby induce increasing tension into the strap part as increasing pressure was applied to slide 34. Alternatively, slide 34 may remain in any position along slide channel 31 after being placed there, and therefore slide 34 may be positioned to cause the hold/release mechanism to be locked, creating no tensile force in the strap part, or slide 34 may be positioned to cause the hold/release mechanism to be released, creating a degree of tension proportional to the position of slide 34 in slide channel 31 up to a maximum tensile force. As noted above, slide 34 may also provide three modes of operation. First, slide 34 may have a position for retracting the strap part. Second, slide 34 may have a position for holding the strap part in the set position. Third, slide 34 may have a position for extending the strap part. These three positions may be fully selectable by the operator, or may have a default position controlled by a spring (e.g. may return to "hold" position absent an input from the operator).

Figure 4:
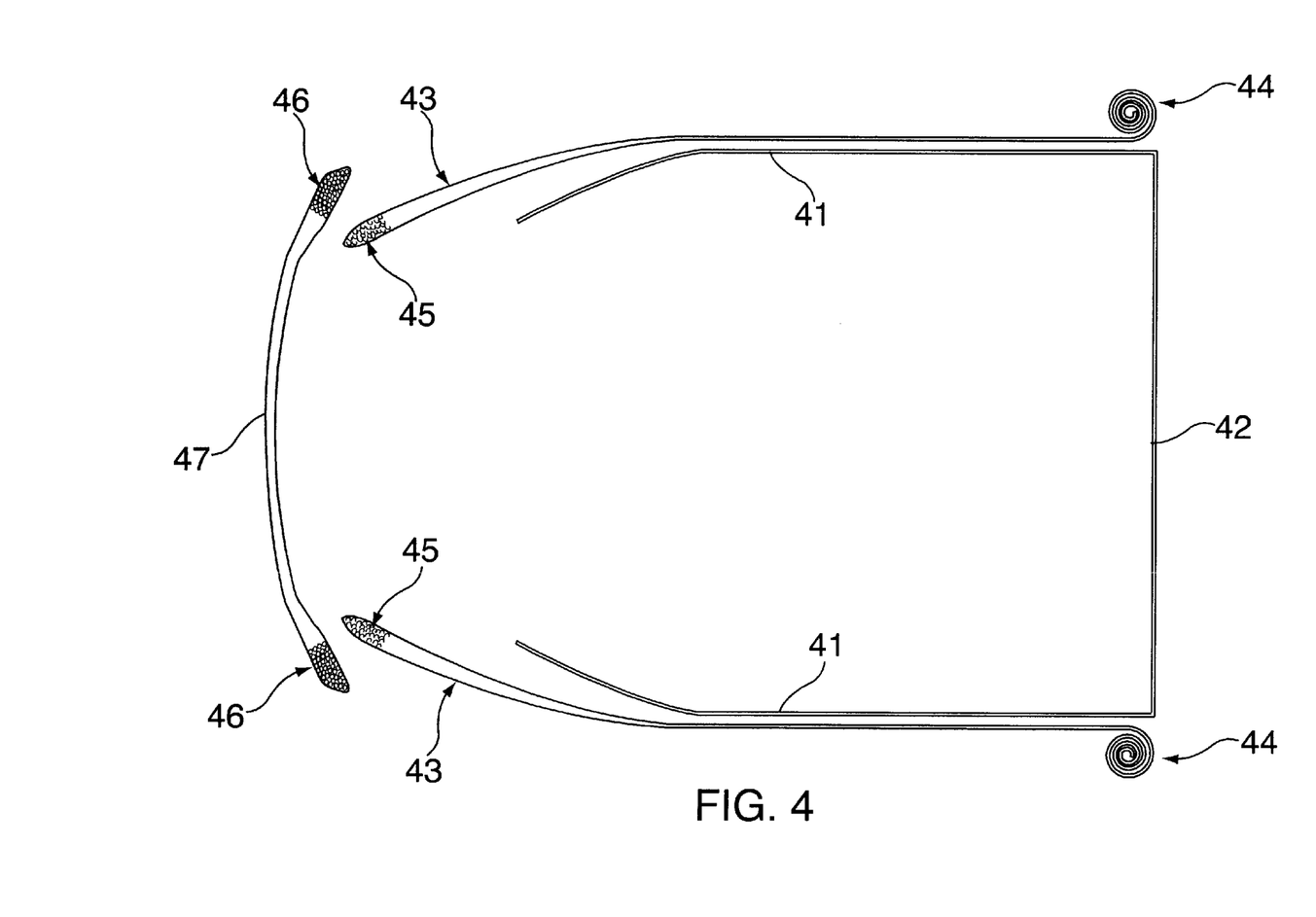
FIG. 4 is a schematic top plan view of a set of eyeglasses with a restraining strap according to another example embodiment of the present invention.

FIG. 4 is a top plan view of another example embodiment of the retractable eyeglass strap. Temple legs 41 connect to the end pieces central frame member 42. Attached to temple legs 41 in a forward section of temple legs 41 is a length adjustor 44 configured to a length of a strap part 43. Strap parts 43 extend rearwardly from length adjustor 44 and have a connecting mechanism on the rearmost section of strap part 43. Illustrated on the rearmost section of strap part 43 in FIG. 4 is a hook material 45. Hook material 45 is connectable with loop material 46 arranged on the end portions of a third strap part 47. Third strap part.47 is removable and enables the eyewear restraining strap to be longer in a fully extended and assembled position than what otherwise might be possible due to design considerations of putting a length adjustor 44 for adjusting the length of strap part 43 inside a hollow portion of temple leg 41.

Figure 5:
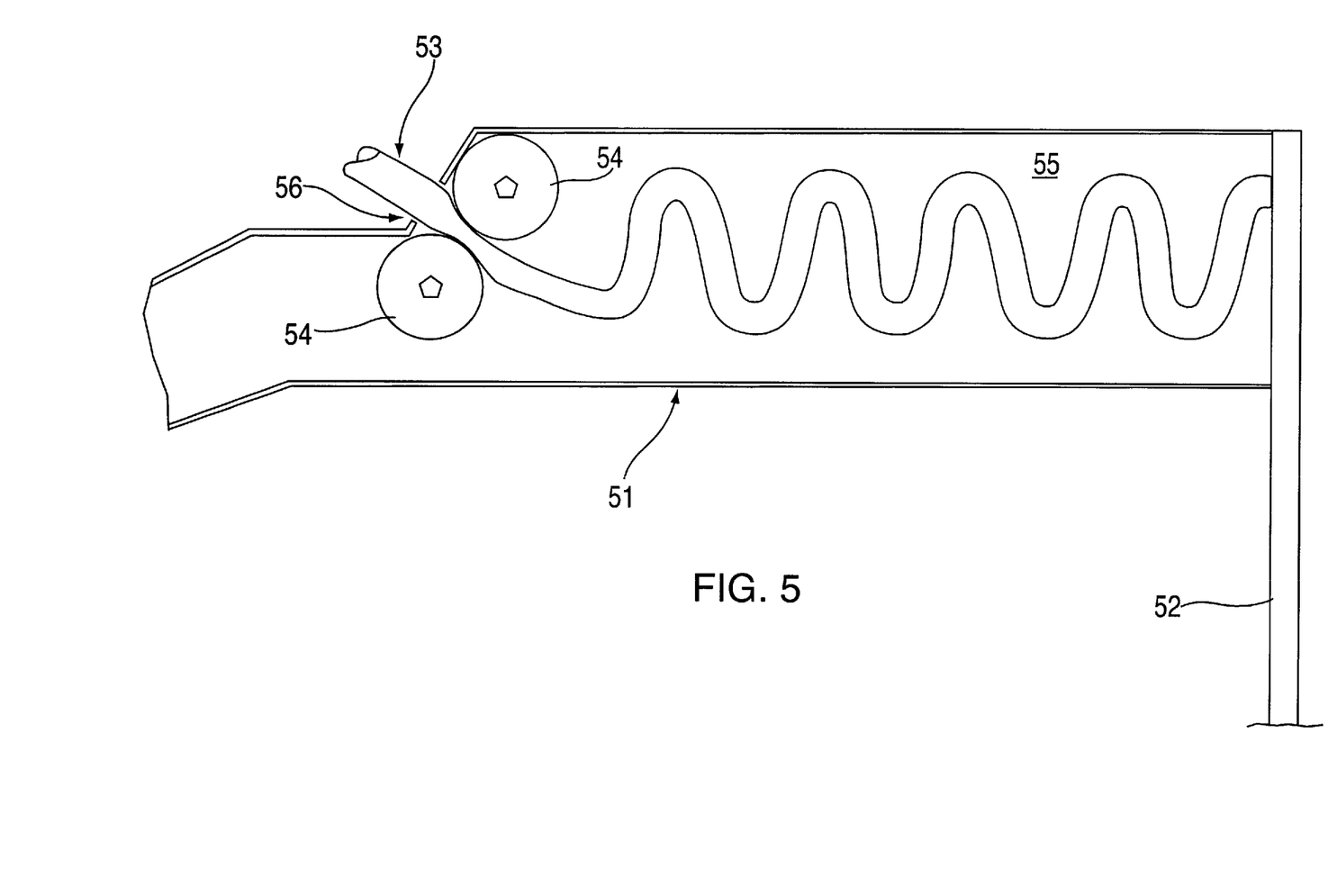
FIG. 5 is a schematic top plan view of a set of eyeglasses with a restraining strap according to another example embodiment of the present invention.

The length adjustor in these example embodiments is illustrated as a winding mechanism oriented with the axis of rotation vertical with respect to the eyewear. However, numerous alternatives are available to permit adjustment of the length of the strap parts. A winding mechanism may have the axis of rotation arranged horizontally, for example, parallel to the central frame member. Alternatively, the axis of rotation may be horizontal and parallel to the temple legs. In this example embodiment, an additional guide mechanism may be provided to direct the strap part onto the spool of the coil. Alternatively, as illustrated in FIG. 5, a mechanism having two elastic wheels 54 pressing together with a pressure and pinching a strap part 53 positioned between the two wheels 54 may be provided. The two wheels may be positioned towards the rear of a hollow temple leg 51, and, when engaged, may rotate in opposite directions simultaneously to draw the strap part into an enclosed temple leg space 55. Strap part 53 may be attached to a forward section of enclosed temple leg space 55, for example, at the junction of temple leg 51 and central frame member 52, to prevent loss or irretrievable extension of strap part 53.

Materials for construction of the temple legs of the present invention include, for example, zylor carbonate, metal, plexisand, optyl, numerous plastics, and any other appropriate material. The strap material may be produced from many different materials and may be rigid or elastic. Additionally, the strap may be partially rigid and/or partially elastic in different sections along its length. The strap material may also be light and durable.

Alternative embodiments within the scope of the invention are feasible, including combinations of different aspects of the various embodiments. Additionally, though use of this eyeglass strap with glasses or sunglasses is described, the present invention also has applications for safety glasses, goggles and any other type of eyewear.

What is claimed is:

1. A device for restraining eyeglasses, the eyeglasses having a central frame member, comprising:
    a first rigid temple leg connectable to a first end of the central frame member;
    a second rigid temple leg connectable to a second end of the central frame member;
    a first strap part having a forward end connected to the first temple leg;
    a second strap part having a forward end connected to the second temple leg;
    an adjustment device configured to adjust a length of at least one of the first strap part and the second strap part; and
    a connection device configured to releasably connect a rearward end of the first strap part and a rearward end of the second strap part;
    wherein the adjustment device is contained within at least one of the first temple leg and the second temple leg.

2. The device according to claim 1, wherein at least one of the first strap part and the second strap part is at least partially formed from elastic material.

3. The device according to claim 1, wherein at least one of the first strap part and the second strap part is formed from rigid material.

4. The device according to claim 1, wherein the adjustment device includes:
    at least one coil arrangement including a central spool and at least one spring, wherein at least one of the first strap part and the second strap part is configured to wind around the central spool, the at least one coil arrangement being driven by the at least one spring.

5. The device according to claim 4, wherein the at least one coil arrangement includes a first coil arrangement and a second coil arrangement, the first coil arrangement being positioned on a forward portion of the first temple leg and being configured to wind the first strap part, the second coil arrangement being positioned on a forward portion of the second temple leg and being configured to wind the second strap part.

6. The device according to claim 1, wherein at least one of the first strap part and the second strap part extends through a hollow portion of at least one of the first temple leg and the second temple leg between the adjustment device and a rearward portion of at least one of the first temple leg and the second temple leg.

7. The device according to claim 6, wherein the adjustment device includes:
    a first coil arrangement, the first coil arrangement being positioned within a hollow portion of the first temple leg, the first coil arrangement being configured to wind the first strap part, the first strap part extending through the hollow portion of the first temple leg between the first coil arrangement and the rearward portion of the first temple leg; and
    a second coil arrangement, the second coil arrangement being positioned within a hollow portion of the second temple leg, the second coil arrangement being configured to wind the second strap part, the second strap part extending through the hollow portion of the second temple leg between the second coil arrangement and the rearward portion of the second temple leg.

8. The device according to claim 1, wherein the connection device includes at least one of a hook-and-loop fastener, a clip mechanism, a magnetic connector, a buckle, a slide connector, a clasp mechanism, and a tongue-and-groove connector.

9. The device according to claim 8, wherein the connection device is positioned so that the first strap part is of substantially equal length to the second strap part when the first strap part and the second strap part are both in a completely extended state.

10. The device according to claim 1, wherein the connection device includes a third strap part, a first end of the third strap part being connectable to the rearward end of the first strap part, and a second end of the third strap part being connectable to the rearward end of the second strap part.

11. A device for restraining eyeglasses, the eyeglasses having a central frame member, comprising:
a first temple leg connectable to a first end of the central frame member;
a second temple leg connectable to a second end of the central frame member;
a first strap part having a forward end connected to the first temple leg;
a second strap part having a forward end connected to the second temple leg;
an adjustment device configured to adjust a length of at least one of the first strap part and the second strap part; and
a connection device configured to releasably connect a rearward end of the first strap part and a rearward end of the second strap part;
wherein the adjustment device is contained within at least one of the first temple leg and the second temple leg;
wherein at least one of the first strap part and the second strap part extends through a hollow portion of at least one of the first temple leg and the second temple leg between the adjustment device and a rearward portion of at least one of the first temple leg and the second temple leg;
wherein the adjustment device includes a first coil arrangement, the first coil arrangement being positioned within a hollow portion of the first temple leg, the first coil arrangement being configured to wind the first strap part, the first strap part extending through the hollow portion of the first temple leg between the first coil arrangement and the rearward portion of the first temple leg;
wherein the adjustment device includes a second coil arrangement, the second coil arrangement being positioned within a hollow portion of the second temple leg, the second coil arrangement being configured to wind the second strap part, the second strap part extending through the hollow portion of the second temple leg between the second coil arrangement and the rearward portion of the second temple leg;
wherein the first coil arrangement includes a first hold/release mechanism configured to activate and deactivate the first coil arrangement; and
wherein the second coil arrangement includes a second hold/release mechanism configured to activate and deactivate the second coil arrangement.

12. The device according to claim 11, wherein:
the first hold/release mechanism is positioned on a frontward side of the first temple leg; and
the second hold/release mechanism is positioned on a frontward side of the second temple leg.

13. The device according to claim 11, wherein:
the first hold/release mechanism includes at least one of a push button device and a slide-lock mechanism; and
the second hold/release mechanism includes at least one of a push button device and a slide-lock mechanism.

14. A device for restraining eyeglasses, the eyeglasses including a first rigid temple leg, a second rigid temple leg, and a central frame member, comprising:
a first strap part having a forward end connectable to at least one of the central frame member and the first temple leg;
a second strap part having a forward end connectable to at least one of the central frame member and the second temple leg;
an adjustment device configured to adjust a length of at least one of the first strap part and the second strap part; and
a connection device configured to releasably connect a rearward end of the first strap part and a rearward end of the second strap part,
wherein the adjustment device is contained within at least one of the first temple leg, the second temple leg, and the central frame member.

15. The device according to claim 14, wherein at least one of the first strap part and the second strap part is at least partially formed from elastic material.

16. The device according to claim 14, wherein at least one of the first strap part and the second strap part is formed from rigid material.

17. The device according to claim 14, wherein the adjustment device includes:
at least one coil arrangement including a central spool and at least one spring, wherein at least one of the first strap part and the second strap part is configured to wind around the central spool, the at least one coil arrangement being driven by the at least one spring.

18. The device according to claim 17, wherein the at least one coil arrangement includes a first coil arrangement and a second coil arrangement, the first coil arrangement being positioned on a forward portion of the first temple leg and being configured to wind the first strap part, the second coil arrangement being positioned on a forward portion of the second temple leg and being configured to wind the second strap part.

19. The device according to claim 14, wherein the adjustment device is contained within at least one of the first temple leg and the second temple leg.

20. The device according to claim 19, wherein at least one of the first strap part and the second strap part extends through a hollow portion of at least one of the first temple leg and the second temple leg between the adjustment device and a rearward portion of at least one of the first temple leg and the second temple leg.

21. The device according to claim 20, wherein the adjustment device includes:
a first coil arrangement, the first coil arrangement being positioned within a hollow portion of the first temple leg, the first coil arrangement being configured to wind the first strap part, the first strap part extending through the hollow portion of the first temple leg between the first coil arrangement and the rearward portion of the first temple leg; and
a second coil arrangement, the second coil arrangement being positioned within a hollow portion of the second temple leg, the second coil arrangement being configured to wind the second strap part, the second strap part extending through the hollow portion of the second temple leg between the second coil arrangement and the rearward portion of the second temple leg.

22. The device according to claim 14, wherein the connection device includes at least one of a hook-and-loop fastener, a clip mechanism, a magnetic connector, a buckle, a slide connector, a clasp mechanism, and a tongue-and-groove connector.

23. The device according to claim 22, wherein the connection device is positioned so that the first strap part is of substantially equal length to the second strap part when the first strap part and the second strap part are both in a completely extended state.

24. The device according to claim 14, wherein the connection device includes a third strap part, a first end of the third strap part being connectable to the rearward end of the first strap part, and a second end of the third strap part being connectable to the rearward end of the second strap part.

25. The device according to claim 14, wherein the adjustment device is contained within the central frame member and at least one of the first strap part and the second strap part extends through at least one of a hollow portion of a first end of the central frame member and a hollow portion of a second end of the central frame member.

26. The device according to claim 25, wherein the adjustment device includes:
   a first coil arrangement, the first coil arrangement being positioned within the hollow portion of the first end of the central frame member, the first coil arrangement being configured to wind the first strap part, the first strap part extending through the hollow portion of the first end of the central frame member; and
   a second coil arrangement, the second coil arrangement being positioned within the hollow portion of the second end of the central frame member, the second coil arrangement being configured to wind the second strap part, the second strap part extending through the hollow portion of the second end of the central frame member.

27. A device for restraining eyeglasses, the eyeglasses including a first temple leg, a second temple leg, and a central frame member, comprising:
   a first strap part having a forward end connectable to at least one of the central frame member and the first temple leg;
   a second strap part having a forward end connectable to at least one of the central frame member and the second temple leg;
   an adjustment device configured to adjust a length of at least one of the first strap part and the second strap part; and
   a connection device configured to releasably connect a rearward end of the first strap part and a rearward end of the second strap part;
   wherein the adjustment device is contained within at least one of the first temple leg, the second temple leg, and the central frame member;
   wherein the adjustment device is contained within at least one of the first temple leg and the second temple leg;
   wherein at least one of the first strap part and the second strap part extends through a hollow portion of at least one of the first temple leg and the second temple leg between the adjustment device and a rearward portion of at least one of the first temple leg and the second temple leg;
   wherein the adjustment device includes a first coil arrangement, the first coil arrangement being positioned within a hollow portion of the first temple leg, the first coil arrangement being configured to wind the first strap part, the first strap part extending through the hollow portion of the first temple leg between the first coil arrangement and the rearward portion of the first temple leg;
   wherein the adjustment device includes a second coil arrangement, the second coil arrangement being positioned within a hollow portion of the second temple leg, the second coil arrangement being configured to wind the second strap part, the second strap part extending through the hollow portion of the second temple leg between the second coil arrangement and the rearward portion of the second temple leg;
   wherein the first coil arrangement includes a first hold/release mechanism configured to activate and deactivate the first coil arrangement; and
   wherein the second coil arrangement includes a second hold/release mechanism configured to activate and deactivate the second coil arrangement.

28. The device according to claim 27, wherein:
   the first hold/release mechanism is positioned on a frontward side of the first temple leg; and
   the second hold/release mechanism is positioned on a frontward side of the second temple leg.

29. The device according to claim 28, wherein:
   the first hold/release mechanism includes at least one of a push button device and a slide-lock mechanism; and
   the second hold/release mechanism includes at least one of a push button device and a slide-lock mechanism.

30. An eyeglass frame, comprising:
   a central frame member;
   a first rigid temple leg connected to a first end of the central frame member;
   a second rigid temple leg connected to a second end of the central frame member;
   a first strap part having a forward end connected to the first temple leg;
   a second strap part having a forward end connected to the second temple leg;
   an adjustment device configured to adjust a length of at least one of the first strap part and the second strap part; and
   a connection device configured to releasably connect a rearward end of the first strap part and a rearward end of the second strap part
   wherein the adjustment device is contained within at least one of the first temple leg, the second temple leg, and the central frame member.

31. The frame according to claim 30, wherein at least one of the first strap part and the second strap part is at least partially formed from elastic material.

32. The frame according to claim 30, wherein at least one of the first strap part and the second strap part is completely formed from elastic material.

33. The frame according to claim 30, wherein at least one of the first strap part and the second strap part is formed from rigid material.

34. The frame according to claim 30, wherein the central frame member includes a frame holding at least one lens.

35. The frame according to claim 30, wherein the adjustment device includes:
   at least one coil arrangement including a central spool and at least one spring, wherein at least one of the first strap part and the second strap part is configured to wind around the central spool, the at least one coil arrangement being driven by the at least one spring.

36. The frame according to claim 35, wherein the at least one coil arrangement includes a first coil arrangement and a second coil arrangement, the first coil arrangement being positioned on a forward portion of the first temple leg and being configured to wind the first strap part, the second coil arrangement being positioned on a forward portion of the second temple leg and being configured to wind the second strap part.

37. The frame according to claim 30, wherein:
the adjustment device is contained within at least one of the first temple leg and the second temple leg; and
at least one of the first strap part and the second strap part extends through a hollow portion of at least one of the first temple leg and the second temple leg between the adjustment device and a rearward portion of at least one of the first temple leg and the second temple leg.

38. The frame according to claim 37, wherein the adjustment device includes:
a first coil arrangement, the first coil arrangement being positioned within a hollow portion of the first temple leg, the first coil arrangement being configured to wind the first strap part, the first strap part extending through the hollow portion of the first temple leg between the first coil arrangement and the rearward portion of the first temple leg; and
a second coil arrangement, the second coil arrangement being positioned within a hollow portion of the second temple leg, the second coil arrangement being configured to wind the second strap part, the second strap part extending through the hollow portion of the second temple leg between the second coil arrangement and the rearward portion of the second temple leg.

39. The frame according to claim 30, wherein the connection device includes a third strap part, a first end of the third strap part being connectable to the rearward end of the first strap part, and a second end of the third strap part being connectable to the rearward end of the second strap part.

40. The frame according to claim 30, wherein the adjustment device is contained within the central frame member and at least one of the first strap part and the second strap part extends through at least one of a hollow portion of a first end of the central frame member and a hollow portion of a second end of the central frame member.

41. The frame according to claim 40 wherein the adjustment device includes:
a first coil arrangement, the first coil arrangement being positioned within the hollow portion of the first end of the central frame member, the first coil arrangement being configured to wind the first strap part, the first strap part extending through the hollow portion of the first end of the central frame member; and
a second coil arrangement, the second coil arrangement being positioned within the hollow portion of the second end of the central frame member, the second coil arrangement being configured to wind the second strap part, the second strap part extending through the hollow portion of the second end of the central frame member.

42. An eyeglass frame, comprising:
a central frame member;
a first temple leg connected to a first end of the central frame member;
a second temple leg connected to a second end of the central frame member;
a first strap part having a forward end connected to the first temple leg;
a second strap part having a forward end connected to the second temple leg;
an adjustment device configured to adjust a length of at least one of the first strap part and the second strap part; and
a connection device configured to releasably connect a rearward end of the first strap part and a rearward end of the second strap part;
wherein the adjustment device is contained within at least one of the first temple leg, the second temple leg, and the central frame member;
wherein the adjustment device is contained within at least one of the first temple leg and the second temple leg;
wherein at least one of the first strap part and the second strap part extends through a hollow portion of at least one of the first temple leg and the second temple leg between the adjustment device and a rearward portion of at least one of the first temple leg and the second temple leg;
wherein the adjustment device includes a first coil arrangement, the first coil arrangement being positioned within a hollow portion of the first temple leg, the first coil arrangement being configured to wind the first strap part, the first strap part extending through the hollow portion of the first temple leg between the first coil arrangement and the rearward portion of the first temple leg;
wherein the adjustment device includes a second coil arrangement, the second coil arrangement being positioned within a hollow portion of the second temple leg, the second coil arrangement being configured to wind the second strap part, the second strap part extending through the hollow portion of the second temple leg between the second coil arrangement and the rearward portion of the second temple leg;
wherein the first coil arrangement includes a first hold/release mechanism configured to activate and deactivate the first coil arrangement; and
wherein the second coil arrangement includes a second hold/release mechanism configured to activate and deactivate the second coil arrangement.

43. The frame according to claim 42, wherein:
the first hold/release mechanism is positioned on a frontward side of the first temple leg; and
the second hold/release mechanism is positioned on a frontward side of the second temple leg.

44. The frame according to claim 43, wherein:
the first hold/release mechanism includes at least one of a push button device and a slide-lock mechanism; and
the second hold/release mechanism includes at least one of a push button device and a slide-lock mechanism.

45. The frame according to claim 43, wherein the connection device includes at least one of a hook-and-loop fastener, a clip mechanism, a magnetic connector, a buckle, a slide connector, a clasp mechanism, and a tongue-and-groove connector.

46. The frame according to claim 45, wherein the connection device is positioned so that the first strap part is of substantially equal length to the second strap part when the first strap part and the second strap part are both in a completely extended state.

* * * * *